Figure 2:
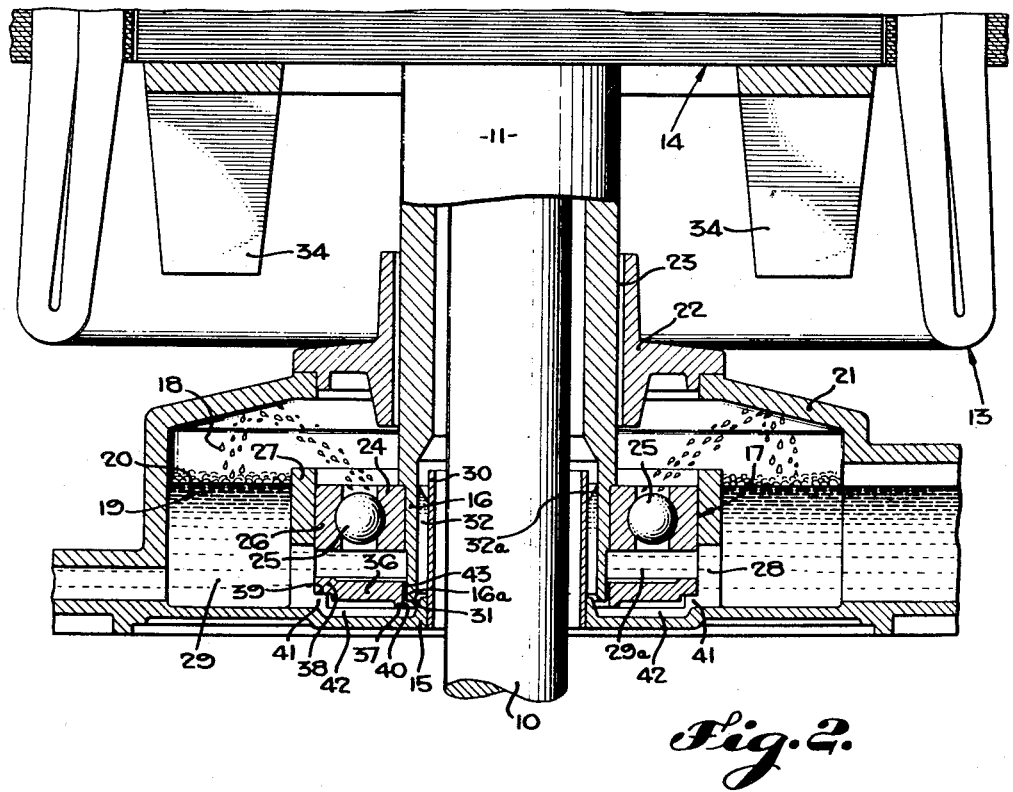

Sept. 25, 1951          F. O. LUENBERGER                2,568,861
            MEANS FOR PREVENTING AIR LEAKAGE
               THROUGH LUBRICATED BEARINGS
                    Filed March 19, 1949

INVENTOR.
FREDERICK O. LUENBERGER
BY
John Flam
ATTORNEY

Patented Sept. 25, 1951

2,568,861

UNITED STATES PATENT OFFICE 2,568,861

MEANS FOR PREVENTING AIR LEAKAGE THROUGH LUBRICATED BEARINGS

Frederick O. Luenberger, Los Angeles, Calif., assignor to U. S. Electrical Motors, Inc., Los Angeles, Calif., a corporation of California Application March 19, 1949, Serial No. 82,336

8 Claims. (Cl. 308—172)

The present invention relates to bearing structures, and more particularly to bearing structures supporting vertically disposed shafts.

An oil leakage problem is presented in vertical shaft electric motors by the suction effects on the bearing lubricant produced by the rotating air cooling fans and the motor assemblies. The suction created tends to draw air through the lubricant in the bearing chamber for the motor shaft, producing oil vapors that are deposited on the stationary windings and other parts of the motor, seriously interfering with the proper and continued functioning of the motor.

An object of the present invention is to provide an improved and comparatively simple arrangement for preventing air from being drawn through the bearing lubricant in vertical shaft motors, thereby preventing undesired oil vapors from being formed.

Another object of the invention is to provide and insure the maintenance of a liquid seal around a hollow shaft of a vertical motor, to prevent air from being drawn through the lubricant in which the bearing supporting the shaft is partly or wholly immersed.

A further object of the invention is to provide a liquid seal for the hollow shaft of a vertical motor and to minimize the force of the motor cooling air suction on the liquid seal, thereby preventing the suction forces from displacing the liquid seal and drawing air through the shaft bearing lubricant.

Yet another object of the invention is to provide a vertical hollow shaft electric motor for rotating a pump shaft disposed within and connected to the hollow shaft, in which the suction created by the rotating motor parts is capable of acting upon the lubricant in a motor shaft bearing chamber, but is, nevertheless, prevented from drawing air from between the motor and pump shafts through the lubricant in the bearing chamber.

This invention possesses many other advantages, and has other objects which may be made more clearly apparent from a consideration of a form in which it may be embodied. This form is shown in the drawings accompanying and form part of the present specification. It will now be described in detail, for the purpose of illustrating the general principles of the invention; but it is to be understood that such detailed description is not to be taken in a limiting sense, since the scope of the invention is best defined by the appended claims.

Figure 1:
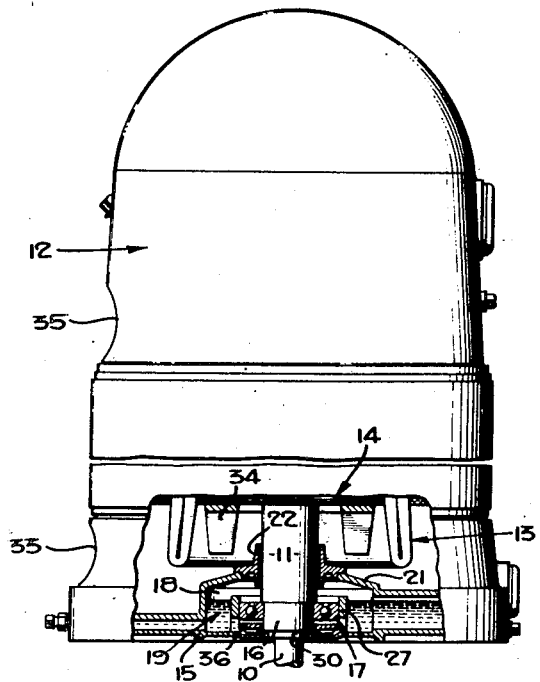

Referring to the drawings:

Figure 1 is a side elevational view, partly in section, of an electric motor embodying the invention; and Fig. 2 is an enlarged vertical section through part of the motor shown in Fig. 1.

The invention is illustrated in the drawings as applied to an electric motor structure disposed vertically, for the purpose of rotating a vertically arranged pump shaft 10 located within the hollow shaft 11 of the motor itself. The general arrangement of parts may be found in the patent to Thomas G. Myers, Patent No. 2,406,505, patented August 27, 1946.

As disclosed and described in the above patent, the electric motor includes a housing structure 12 containing the usual stator structure 13 and rotor structure 14. The rotor structure is secured to the vertical hollow motor shaft 11, which is suitably attached to the pump shaft 10 disposed therewithin. The mode of attachment of the shafts 10, 11 to one another and the manner of supporting their upper portions in the housing structure 12 forms no part of the present invention, and may be found by way of example in the above patent.

The pump shaft 10 depends through the base portion 15 of the housing structure 12, whereas the lower end 16 of the hollow motor shaft 11 terminates immediately above this stationary base portion. The lower end of the shaft 11 is rotatably supported in a bearing structure 17 disposed within a bearing chamber 18 containing a lubricant 19 that is preferably maintained at a predetermined level 20. The bearing chamber 18 forms part of the housing structure 12, extending upwardly from the base 15, and having an upper wall 21 closed by an annular cap 22 disposed around the hollow motor shaft 11. This cap is displaced from the shaft 11 to provide an annular clearance space 23 forming a passage between the bearing chamber 18 and the portion of the housing structure containing the rotor 14 and the stator 13.

As stated above, the lower end 16 of the hollow shaft 11 is supported in the bearing structure 17. This structure consists of an inner race 24 secured to the hollow shaft 16 and on which a plurality of circumferentially arranged rolling elements 25, such as bearing balls, may roll. These ball bearing elements engage an outer race 26, which is suitably secured to a stationary vertical bearing support 27 extending upwardly from the base 15 of the housing structure 12.

The vertical bearing support 27 is provided with suitable lower openings 28 to permit oil to flow from the supply of lubricant 19 in the outer portion 29 of the bearing chamber well to the bearing 17 in the inner portion 29a of the well. The level 20 of the lubricant is preferably sufficiently high to insure substantially complete immersion of the bearing elements therewithin.

The lubricant is prevented from flowing from the chamber 18 down along the pump shaft 18 by a stationary oil retaining tube 30 disposed between the pump and motor shafts 10, 11. The lower end of this tube 30 is secured to the housing base 15 and extends upwardly to a point at least slightly higher than the desired oil level 20 in the reservoir 18. The oil will flow from the reservoir around the lower end 31 of the hollow motor shaft 11 into the annular space 32 between the retaining tube or sleeve 30 and the hollow shaft 11, seeking substantially the same level as that in the oil reservoir itself.

The electric motor windings and other parts are cooled by circulating air. This air is drawn through one or more suitable air inlets 33 in the housing structure 12 by a plurality of fan blades 34 secured to the rotor 14, and by the rotation of the rotor itself, the air being discharged at the other end of the motor windings through one or more suitable outlet openings 35 in the housing structure. The rotation of the fan blades 34 and rotor 14 creates a suction effect that tends to draw lubricant from the reservoir 18, lowering the level of the liquid seal 32a between the retaining tube 30 and hollow motor shaft 11 to a point that might be below the lower end 31 of the hollow shaft. This lowering of the level of the lubricant 32a in the annular space 32 allows air to be sucked from between the pump and motor shafts 10, 11 through the annular space 32 and upwardly through the lubricant 19 in the reservoir, producing oil vapors that are deposited on the motor windings and other parts. This produces a serious condition that might prevent proper operation of the vertical shaft electric motor.

The present invention overcomes the above noted disadvantage by insuring the retention of the liquid oil seal 32a in the clearance space 32 between the hollow shaft 11 and oil retaining tube or sleeve 30. To accomplish this purpose, the lower portion 16 of the hollow shaft 11 extends a substantial distance below the bearing structure 17 toward the housing base 15. A stationary annular baffle plate or ring 36 is disposed around the lowermost portion 16a of the shaft and rests upon the base. The inner portion of the plate 36 has a depending ring 37 supported upon the base, whereas the outer portion 38 of the plate rests upon a suitable shoulder 39 formed on the bearing support 27.

The inner wall 40 of the baffle plate is disposed closely adjacent the periphery of the hollow motor shaft portion 16a, the plate itself extending substantially across the bearing 17 to its vertical support 27. Lubricant is permitted to pass from the outer portion 29 of the reservoir through comparatively large entrance apertures 41 between the baffle plate 36 and the housing base 15, and also through channels 42 formed in the base below the baffle plate 36 into the clearance space 32 between the oil retaining tube 30 and hollow shaft portion 16. The passage 41, 42 for lubricant from the reservoir 29 below the baffle plate and into the clearance space 32 between the hollow shaft 11 and tube 30 is comparatively large to allow free passage of lubricant in the direction mentioned. However, the clearance space 43 between the baffle plate 36 and the hollow motor shaft 11 is comparatively small or close, forming a restricted passage. As a result, the suction created by the rotating fan blades 34 and rotor 14 cannot suck or pump oil through this small clearance space 43 faster than additional oil or lubricant 19 enters the apertures 41 from the outer reservoir 29 and flows through the space 42 beneath the baffle plate 36 to the lower end of the restricted clearance space 43. That is, the clearance space 43 has a greater resistance to oil flowing through it than the entrance apertures 41 and the space 42 under the baffle plate 36.

As a result of the foregoing arrangement, the oil level in the clearance space 32 between the retaining tube 30 and hollow shaft 11 will drop very little, and will be maintained at a level substantially equal to that in the outer reservoir 29. This level may be, for example, several inches above the lower end 31 of the hollow shaft, and as long as it is maintained, insures against entry of air around the lower end of the hollow shaft into the bearing chamber 18.

The inventor claims:

1. In a device of the character described: a vertical shaft; a bearing structure supporting said shaft; a lubricant well containing said structure; lubricant retaining means spaced laterally from said shaft to form a space adapted to receive a liquid; and means providing a passage for the relatively free flow of lubricant from said well to said space and another annular passage for the restricted flow of lubricant from said space to the portion of the well containing said structure.

2. In a device of the character described: a vertical shaft; a bearing structure supporting said shaft; a lubricant well having an inner portion containing said structure and an outer portion surrounding said structure; lubricant retaining means spaced from said shaft to form a space adapted to receive lubricant from said well; baffle means in said well below said structure, said baffle means being disposed around and closely adjacent said shaft to form a restricted intercommunicating passage between the well above and below said baffle means, said baffle means being arranged to permit relatively free flow of lubricant below said baffle means from the outer portion of said well to said space and restricted passage.

3. In a device of the character described: a hollow vertical shaft; a bearing structure disposed around the exterior of and supporting said shaft; a lubricant well containing said structure; lubricant retaining means disposed within and spaced laterally from said shaft to form an annular space adapted to contain lubricant; and means below said bearing structure providing a passage for the relatively free flow of lubricant from said well to said space and another annular passage for the restricted flow of lubricant from said space to the portion of the well containing said structure.

4. In a device of the character described: a hollow vertical motor shaft; a vertical pump shaft disposed within said hollow shaft; a bearing structure supporting said hollow shaft; a lubricant well containing said structure; tubular means extending upwardly within said hollow shaft and disposed around said pump shaft to form an annular space with said hollow shaft adapted to contain a lubricant; and means providing a passage for the relative free flow of lubricant from said well to said space and another annular passage for the restricted flow of lubricant from said space to the portion of the well containing said structure.

5. In a rotary structure including a device of the character described: a hollow vertical shaft; a bearing structure supporting said shaft; a lubricant well having an inner portion containing said structure and an outer portion surrounding said structure; tubular means disposed within and spaced from said shaft to form an annular space adapted to contain lubricant from said well; means below said bearing structure providing for the relative free flow of lubricant from the outer portion of said well to said space; and nonrotary means cooperating with the rotary structure and forming a restricted path for the restricted flow of lubricant from said space to the inner portion of said well.

6. In a device of the character described: a hollow vertical shaft; a bearing structure supporting said shaft; a lubricant well having an inner portion containing said structure and an outer portion surrounding said structure; tubular means disposed within and spaced from said shaft to form an annular space adapted to contain lubricant from said well; a baffle plate in said well below said structure, said baffle plate being disposed around and closely adjacent said shaft to form a restricted intercommunicating passage between the well above and below said baffle, said baffle being disposed above a lower portion of said well to permit relatively free flow of lubricant below said baffle from the outer portion of said well to said restricted passage.

7. In a device of the character described: a hollow vertical shaft; a bearing structure supporting said shaft; a lubricant well having an inner portion containing said structure and an outer portion surrounding said structure, said well being adapted to contain a lubricant at a level substantially immersing said structure; a retaining tube within said shaft with its upper end terminating at a point substantially above the lower end of said shaft, said tube being spaced from said shaft to form a space adapted to contain lubricant from said well; a stationary baffle in said well below said structure, said baffle being disposed around and closely adjacent the lower end of said shaft to form a restricted passage with said shaft through which lubricant can flow from below said baffle to the region in said well above said baffle, said baffle being arranged to permit relatively free flow of lubricant below said baffle from the outer portion of said well to said restricted passage.

8. In a device of the character described: a hollow vertical shaft; a vertical pump shaft disposed within said hollow shaft; a bearing structure supporting said hollow shaft; a lubricant well having an inner portion containing said structure and an outer portion surrounding said structure, said well being adapted to contain a lubricant at a level substantially immersing said structure; a retaining tube extending upwardly within said hollow shaft and disposed around said pump shaft, the upper end of said tube terminating at a point substantially above the lower end of the hollow shaft and said tube being spaced from said hollow shaft to form a space adapted to contain a lubricant from said well; a stationary baffle in said well below said structure, said baffle being disposed around and closely adjacent the lower end of said hollow shaft to form a restricted passage with said hollow shaft through which lubricant can flow from below said baffle to the region in said well above said baffle, said baffle being arranged to permit relatively free flow of lubricant below said baffle from the outer portion of said well to said restricted passage.

FREDERICK O. LUENBERGER.

REFERENCES CITED

The following references are of record in the file of this patent:

UNITED STATES PATENTS

| Number | Name | Date |
| --- | --- | --- |
| 1,412,342 | Dearborn | Apr. 11, 1922 |
| 2,243,961 | Howarth | June 3, 1941 |
| 2,427,748 | Schuck | Sept. 3, 1947 |